US008827085B2

(12) United States Patent
Seo et al.

(10) Patent No.: US 8,827,085 B2
(45) Date of Patent: Sep. 9, 2014

(54) MONOFILAMENT-REINFORCED HOLLOW FIBER MEMBRANE

(75) Inventors: Chang Min Seo, Hwaseong-si (KR); Gyeong Mo Lee, Uiwang-si (KR)

(73) Assignee: Cheil Industries Inc., Uiwang-si (KR)

( * ) Notice: Subject to any disclaimer, the term of this patent is extended or adjusted under 35 U.S.C. 154(b) by 32 days.

(21) Appl. No.: 13/338,557

(22) Filed: Dec. 28, 2011

(65) Prior Publication Data

US 2012/0273409 A1  Nov. 1, 2012

(30) Foreign Application Priority Data

Apr. 26, 2011 (KR) .................. 10-2011-0039181
Dec. 14, 2011 (KR) .................. 10-2011-0134597

(51) Int. Cl.

| | | |
|---|---|---|
| B01D 69/08 | (2006.01) | |
| B29C 70/22 | (2006.01) | |
| B01D 71/34 | (2006.01) | |
| B29K 469/00 | (2006.01) | |
| B01D 61/14 | (2006.01) | |
| B29K 277/00 | (2006.01) | |
| B29K 669/00 | (2006.01) | |
| B29K 27/00 | (2006.01) | |
| B29K 269/00 | (2006.01) | |
| B29K 309/08 | (2006.01) | |
| B29K 267/00 | (2006.01) | |
| B29K 69/00 | (2006.01) | |
| B29K 31/00 | (2006.01) | |
| B29K 227/06 | (2006.01) | |

(52) U.S. Cl.

CPC .............. *B01D 69/08* (2013.01); *B29C 70/222* (2013.01); *B29K 2225/06* (2013.01); *B29K 2469/00* (2013.01); *B01D 61/145* (2013.01); *B29K 2827/16* (2013.01); *B29K 2227/16* (2013.01); *B29K 2277/00* (2013.01); *B01D 69/087* (2013.01); *B29K 2669/00* (2013.01); *B29K 2027/16* (2013.01); *B29K 2869/00* (2013.01); *B29K 2231/04* (2013.01); *B29K 2427/16* (2013.01); *B01D 2325/40* (2013.01); *B29K 2631/04* (2013.01); *B29K 2269/00* (2013.01); *B29K 2309/08* (2013.01); *B01D 71/34* (2013.01); *B29K 2233/08* (2013.01); *B01D 2323/42* (2013.01); *B29K 2267/00* (2013.01); *B01D 61/147* (2013.01); *B29K 2069/00* (2013.01); *B29K 2031/04* (2013.01); *B29K 2627/16* (2013.01); *B29K 2831/04* (2013.01); *B29K 2227/06* (2013.01)

USPC .................. 210/490; 210/500.23; 210/500.27

(58) Field of Classification Search

CPC ........... B01D 2323/42; B01D 2325/40; B01D 61/145; B01D 61/147; B01D 69/08; B01D 69/087; B01D 71/34; B01D 69/082

See application file for complete search history.

(56) References Cited

U.S. PATENT DOCUMENTS

| | | | |
|---|---|---|---|
| 3,644,139 | A | 2/1972 | Schwarz |
| 4,061,821 | A | 12/1977 | Hayano et al. |
| 5,472,607 | A | 12/1995 | Mailvaganam et al. |
| 5,914,039 | A | 6/1999 | Mahendran et al. |
| 6,354,444 | B1 | 3/2002 | Mahendran et al. |
| 7,165,682 | B1 | 1/2007 | Ji |
| 7,172,075 | B1 | 2/2007 | Ji |
| 7,306,105 | B2 | 12/2007 | Shinada et al. |
| 7,861,869 | B2 | 1/2011 | Beckers et al. |
| 7,909,172 | B2 | 3/2011 | Carr |
| 8,529,814 | B2 | 9/2013 | Palinkas |
| 2004/0197557 | A1 | 10/2004 | Eshraghi et al. |
| 2009/0206026 | A1 | 8/2009 | Yoon et al. |

FOREIGN PATENT DOCUMENTS

| | | |
|---|---|---|
| KR | 10-2004-0008935 | 1/2004 |
| WO | 03/097221 A1 | 11/2003 |
| WO | 2010/148517 A1 | 12/2010 |

OTHER PUBLICATIONS

Square—Wolfram MathWorld [Apr. 8, 2008; 5 pages].*

* cited by examiner

Primary Examiner — Matthew O Savage
Assistant Examiner — Benjamin J Behrendt
(74) Attorney, Agent, or Firm — Christie, Parker & Hale, LLP

(57) ABSTRACT

A hollow fiber membrane is formed by embedding a braid having a spiral open weave of monofilaments only, to avoid a "whiskering" problem common in prior art multifilament braid-supported tubular membranes. The open weave is characterized by contiguous, circumferential, rhomboid-shaped areas of polymer film separated by monofilaments. When the braid is supported on a plasticized PVA cable it can be infiltrated with membrane polymer which, when coagulated embeds the braid positioning it around the lumen. The spiral weave, free of any circumferentially constricting monofilament, when embedded in film, allows the membrane to be biaxially distensible. In other words, the membrane has "give" not only in the axial or longitudinal direction but also in the radial direction. "Give" in the radial direction permits soiled membranes to be backwashed under higher pressure than in a comparable braid which is not radially distensible.

6 Claims, 4 Drawing Sheets

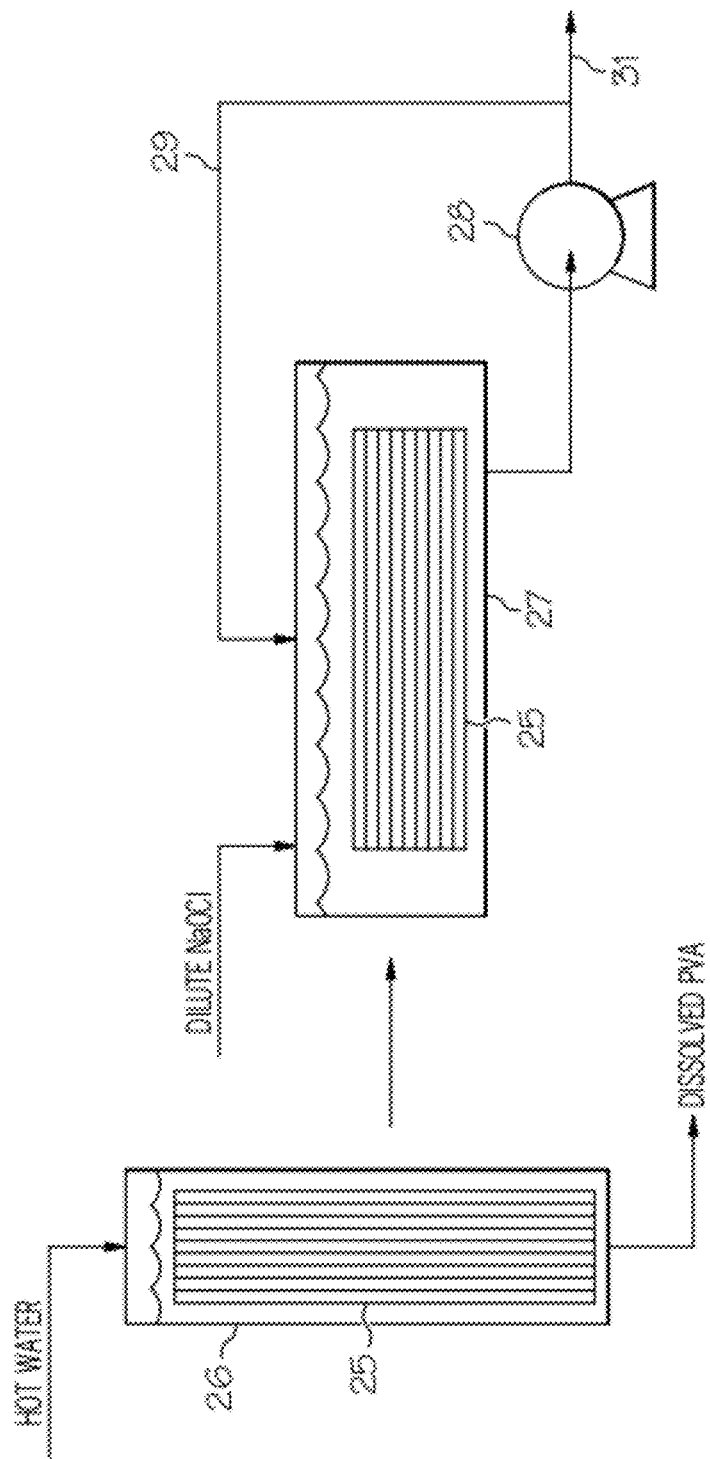

MONOFILAMENT-REINFORCED HOLLOW FIBER MEMBRANE

FIELD OF THE INVENTION

This invention relates to a macroscopic composite hollow fiber membrane which is typically reinforced with multiple multifilament yarns braided into a tubular shape; each such yarn is made by plaiting or twisting multiple strands or monofilaments of a polymer having desired tensile strength. The tubular braid is then coated with a membrane-forming dope (polymer solution or "dope" for brevity) which is coagulated to form a tubular polymer membrane having a lumen diameter of at least 0.5 mm. Such construction is designed for use in demanding applications in which permeate is required to meet strict specifications. For example, for water filtration, one or more skeins are used, each skein comprising a multiplicity of hollow fiber membranes (hereafter "fibers" or "membranes" for brevity) in a module which is deployed in a reservoir of "dirty" water to be filtered. A "skein" of fibers is a bundle of fibers deployed adjacent one and another, all in the same general direction. A "module" is a skein of fibers opposed ends of which are secured in a header, typically by potting. Multiple modules are typically deployed in a reservoir containing a large amount of liquid to be filtered, e.g. in municipal water filtration plants. When, during filtration, the pressure drop through the fibers in a module gets sufficiently high, the module is backwashed with permeate under pressure. Desirable systems provide permeate economically, by providing high permeate flow and by minimizing damage to the hollow fiber membranes.

BACKGROUND OF THE INVENTION

Braided hollow fiber membranes are commonly used in modules containing from several hundred to several thousand membranes. Damage to a single membrane in a module, which damage results in dirty water contaminating the permeate, is a serious problem which occurs more often than desired. Though the permeate is typically water, the permeate may be any filterable liquid to be separated from a suspension or dispersion of finely divided particles in the liquid.

To date, numerous braided membranes have been disclosed, each of which purports to provide desirable filtration efficiency but offer scant useful knowledge relating to avoiding the damage to a membrane or maximizing permeate efficiency. Emphasis on physical strength of the membrane is embodied in disclosures of U.S. Pat. Nos. 3,644,139; 4,061,821; 5,472,607; 5,914,039; 6,354,444; 7,165,682; 7,172,075; 7,306,105; 7,861,869; 7,909,172 and others. The requirement of strength decreed that these prior art braids be made by braiding multiple yarns, each comprising lengths of multiple monofilaments (or "filaments" for brevity). The drawbacks of using multifilament yarns were either overlooked or ignored.

Membranes such as are disclosed in U.S. Pat. No. 4,061,821 to Hyano et al, (hereafter '821) have braid embedded beneath a thick polymer film to provide a stabilizing effect during use of the membrane. The term "embedded" as used herein describes yarn or monofilament with at least 99% of its surface coated with polymer. Braid having an inner diameter in the range of 0.5-10 mm and unspecified "thin thickness" is made from filaments overlying and randomly overlapping one and another (see FIGS. 4, 5 & 6 in '821) in multiple layers but are preferably made from multifilament yarn. The stabilizing effect of the openings in the reinforcing material was lost (see sentence beginning at the bottom of col 4, and bridging cols 4 and 5) when the braid was coated with polymer, so that their reinforced membrane was not an effective membrane.

The problem of stability was addressed in U.S. Pat. No. 5,472,607 to Mahendran et al, (hereafter '607) which teaches a film having a wall thickness in the range from 0.01 mm to 0.1 mm, supported on the outer circumferential surface of a preshrunk braid; a major portion of the area of the circular cross-section of the porous tubular support, viewed along the longitudinal central axis, is free from film and not embedded in film. Thus, it was not known how embedding the braid in the film affected the performance of the membrane; nor was it established whether failing to embed the braid in the film provided a significant advantage.

Membranes such as are disclosed in U.S. Pat. No. 6,354,444 to Mahendran et al, (hereafter '444) are produced by first weaving a tubular braid of multifilament yarn to have a cylindricity>0.8, preshrinking the braid, then coating the outer circumferential surface of the cylindrical braid with a dope of polymerizable membrane-forming polymer. The term "cylindricity" (sometimes referred to as "roundness") refers to how perfectly the circular cross-section of the tubular support matches the geometry of a true circle drawn to correspond to the mean diameter of the braid, a perfect match being 1.0. By "weaving" is meant that the filaments are interlaced without being knotted (as they would be if the braid was knit). "Dope" refers to fluid "membrane polymer", e.g. poly vinylidene fluoride ("PVDF") whether molten or in a solution. If in solution and coagulated, the dope forms a film having a wall thickness of >0.2 mm and with desired attributes for the filtration of fluid to be filtered, typically dirty water. The '444 braid is relatively dense, having an air permeability in the range of from 1 to 10 cc/sec/cm$^2$ at 1.378 kPa so that the voids in the braid are small enough to provide substantial resistance to the passage of air, and thus inhibit substantial penetration of polymer. The braid is preshrunk to provide stability of the braid. Yarn lying in a generally longitudinal orientation (along the z-axis) provides extension at break of the uncoated braid of at least 10% which extensibility is referred to as "give".

The weave of the '444 braid is a circularly woven tubular braid. Such braids are tightly woven with at least one circumferential yarn lying in a generally x-y plane (z axis is longitudinally axial). This orientation necessarily constricts and prevents radial distension of the braid, but the preshrunk braid does have "give" in the longitudinal direction. However, when the braid is coated with a relatively elastic polymer to form the membrane, it is essentially longitudinally non-extensible (along the z-axis). In other words, the '444 membrane, whether pulled in the axial direction or pressured from within during backwashing, has essentially no "give". The importance of "give" relates particularly to effective backwashing. The higher the backwashing pressure the better, if it does not damage the membranes, because such pressure allows faster and more effective cleansing of contaminated membranes and therefore provides an economic advantage.

Because the '444 braid is deliberately not embedded in the polymer, yarn defining the lumen (bore) of the membrane is not coated with polymer. Other references disclose braids woven to minimize the problem of too-deep penetration of the polymer film. The non-embedded yarn, in all such instances, is prone to damage such as pin-holes. Such damage lessens the initial high bubble point of the freshly deployed membrane. The "bubble point" refers to the pressure under which a stream of air escapes through the largest pore in a wall of a wetted, defect-free membrane which has desirable flux. Further, the importance of stability of the structure of the braid during operation, particularly the effect of shrinkage, was not known.

Though U.S. Pat. No. 7,861,869 discloses a semipermeable capillary membrane reinforced by a braid of monofilament yarn, the yarn is made by bundling multiple monofilaments (36 in example 1). The braid is not made by braiding separate monofilaments. Penetration of the dope into the braid is controlled so that the inner channel (lumen) of the braid is not blocked. The process taught herein prepares an "outer skinned" version of the reinforced membrane, explicitly avoiding embedding the braid.

WO-A-0397221A1 describes a tubular fiber membrane which is longitudinally reinforced by unbraided yarns, not by a braid. The axial bore is formed by injecting an internal coagulation solution in the centre but the thickness of the annular film defining the lumen cannot be controlled.

US 2009/0206026 A1 to Yoon et al, titled "External pressure type hollow fiber membrane having reinforcing supporter with monofilament for gas separation and water treatment, and method and apparatus for preparing the same" states: "The hollow fiber membrane of the present invention has excellent pressure resistance and high tension force by using the rigid and tubular supporter, an improved softness by using the monofilaments, and an increased bonding force between the supporter and the coating layer by increasing the concave-convexo degree of the reinforcing supporter." (see '026 Abstract, lines 6-11). That the tubular supporter in the described hollow fiber membrane is rigid, is reiterated under "Industrial Capability" (see line 3 of paragraph [0057]. Such rigidity serves to distinguish the '026 membrane over the membrane of '607 to Mahendran et al, discussed in '026 as being the most relevant reference which teaches that "The support itself is so flexible (flaccid) that it does not have a circular cross-section and collapses with finger pressure." (see Abstract, lines 4-6) "By "flaccid" is meant that the denier of monofilaments used in the yarns or "ends" for carriers which are braided, and the number of picks/unit length of the braid, are such that a tubular braid has very little mechanical strength in a vertical plane normal to its longitudinal central axis, so that it is so flexible that it can be easily manually tied into a knot. A typical braid starts out as multiple filaments which make up a single "end" and two "ends" are plied together in 3.8 twists/25.4 mm to make up a yarn or "carrier". Multiple carriers, preferably 24, are used to braid a tubular braid." (see '607, col 3 lines 24-33). Clearly, the '026 statement relating to a rigid and tubular supporter are meant to distinguish over the '607 braid.

Note that though FIGS. 4 and 5 in '026 purport to be photomicrographs of the reinforcing supporter, both woven with monofilaments of 130 deniers and of 32 and 24 yarns respectively, other than stating that the diameter of the supporter can be controlled according to the number of cones (see [0042]), there is no indication in either photomicrograph as to the diameter of the woven braids shown. Neither is there any identification, anywhere, either of the weave, or of the machinery, used to make a braid having any specified diameter, much less a nominal inside diameter in the range from about 1.0 mm (to make a membrane having a nominal outer diameter of 1.5 mm, depending upon the denier of the monofilament to be used), to about 2.5 mm (to make a membrane having a nominal outer diameter of 3.0 mm, depending upon the denier of the monofilament to be used), as specified for the braid and membrane claimed herein. In particular, there is no mention of using a flexible cable, dissolvable in an aqueous solution (referred to as "aqueous-dissolvable") upon which to weave the braid. By "nominal" is meant "average".

Particularly noteworthy is that the '026 membrane is woven with both, monofilament and multifilament yarns; this provides convincing evidence that the inventors of the '026 braid failed to realize that "whiskering" and "fuzz" were the root causes of failure in membranes with multifilament braids.

In FIG. 6 of '026 there is illustrated an automatic device in which a perforated wire 2 extends along the central vertical axis of an injector for an internal coagulating solution 4. A high pressure injection nozzle 3 injects the internal coagulating solution onto the wire, and the solution is also squirted through the perforations while the reinforcing supporter passes over and is forwarded by the roller 5 in contact with the wire 2. (see [0045]).

Aside from the problem of perforating about a 2.0 mm diameter wire, doing which is beyond the skill of the inventors herein, it will be seen in the test presented in example 1 below, that an open weave tubular braid having the diameter claimed herein, made with woven monofilament in the size range claimed herein, cannot be forwarded (or "passed") over a wire as described in '026 because the friction is too great, and other reasons. Numerous attempts to forward a tubular braid of monofilaments only (see example 1 below) to make a membrane in the range of nominal outer diameters from 1.5-3.0 mm, fails to produce a usable, undistorted, uniform membrane. The '026 reference is therefore a non-enabling disclosure. Moreover, manually pulling the braid over the wire after the braid is coated with coagulant polymer, results in destruction of the membrane, again, because of the flaccid membrane and its excessive friction. To make and use the membrane claimed in '026 would require undue experimentation.

US 2004/0197557 to Eshraghi et al teaches (a) providing a molten removable substrate material in the form of an extrudate of a molten polymeric material (see [0011] to make a hollow fiber membrane having a dissolvable core, and the use of reinforcing fibers as follows: "Additionally, one or more reinforcing fibers can be incorporated into such polymeric membrane to form a fiber-reinforced tubular polymeric membrane structure. Preferably, such reinforcing fibers extend continuously along the longitudinal axis of the fibrous core or substrate and therefore provide axial reinforcement to the hollow fibrous membrane. Fiberglass having an average diameter of about 0.1-500 µm is particularly suitable for practice of the present invention, while other fibrous materials, including but not limited to carbon fibers, metal fibers, resin fibers, and composite fibers, can also be employed for reinforcing the hollow fibrous membrane. The reinforcing fiber can either be co-extruded with one of the polymeric membrane-forming layers, or be encapsulated between two polymeric membrane-forming layers, to form an integral part of the hollow fibrous membrane." (see [0085]) There is no suggestion, beyond the statement that "such reinforcing fibers extend . . . hollow fibrous membrane" how one or more reinforcing fibers are to be incorporated into the polymeric membrane.

The '557 publication states "the solid core fiber itself is formed of a solid-phase removable substrate material, and at least one layer of a polymeric membrane-forming material is coated directly onto such solid core fiber." (See [0023]). It thereafter states: "the molten removable substrate material is co-extruded with the membrane-forming polymer. (See [0041]-[0047]).

It is clear that Eshraghi et al did not extrude PVA because it degrades before it can be melt-extruded, irrespective of what grade of PVA is used. As evident in example 2 below, attempts were made to extrude each of three grades of PVA available from Kuraray, namely fully hydrolyzed (F-05 and F-17); intermediate hydrolyzed (M-17); and partially hydrolyzed (P-24, P-20, P-17 and P-05). The temperature at which each of the polymers degrades is lower than its softening temperature. Therefore each attempt resulted in severe degradation of each.

In the description of the process illustrated in FIG. 3A, the '557 publication states "a string or a tow of removable core fiber 122 from a spool 120 is passed through the extrusion die 124. A thin layer of the viscous polymeric solution 101 is therefore applied onto the removable core fiber 122, forming a coated fiber 132." ([See 0086]) The core fiber 122 could not have been flexible PVA as it necessarily would have to be plasticized with just sufficient plasticizer to provide a core fiber which was not degraded.

A core made from PVA in a solution of hot water has insufficient strength to maintain its cylindrical form—discovered to be a critical requirement for making the open weave braid of this invention. Not being able to make a PVA core negated the suggestion in '557 that PVA may be used for the core.

As for the reinforcing the '557 publication states "The reinforcing fiber can either be co-extruded with one of the polymeric membrane-forming layers, or be encapsulated between two polymeric membrane-forming layers, to form an integral part of the hollow fibrous membrane." There is no suggestion that the extrudate be covered with a braid before being coated with membrane polymer, and no way this could be accomplished using the teachings of their disclosure.

In a manner analogous to that stated above, commercially available ethyl vinyl alcohol (EVOH) from Kuraray; commercially available polylactic acid from Nature Works; commercially available nylons from Shakespeare; and no-longer commercially available copolyester from Eastman, failed to produce a usable core despite numerous trials in each of which the conditions of extrusion were changed.

Clearly the disclosure of the '557 publication is not an enabling disclosure.

With respect to the use of monofilaments, apart from a braid thereof, the '557 publication provides no indication that it recognized the ill effects of "whiskering" and "fuzz" in a braid made with at least some multifilament yarns.

Neither did the '557 publication recognize that only a tubular braid embedded near the inside diameter of the membrane so as to reinforce the lumen provided the highest peel strength, bubble point and permeate efficiency. There is no suggestion that a braid be woven using only monofilaments woven in a particular way, namely with an open weave so as to avoid having circumferentially restricting filaments which would not have "give" under abnormally high backwashing pressure.

Publication No. WO/2010/148517 to Cote et al (hereafter the "'517 publication") presents the concept of using a "dissolvable filament (solid or hollow) core" to make a hollow fiber membrane (see [0040]). It states that "the core can be a solid or capillary tube can be later dissolved in a solvent, preferably the solvent used to coagulate the membrane (typically water). Examples of water-soluble polymers include PVA, EVOH (made by Kuraray), as well as some forms of polyester (available from Eastman) and nylon (available from Shakespeare)." (see [0065]). Not mentioned is high amorphous vinyl alcohol (HAVOH) and more commonly available polylactic acid (PLA), cellulose acetate, hydroxyethyl cellulose, polyethylene oxide (PEO) and polyethylene glycol (PEG), all of which are water-soluble. If he had used PVA as a removable core, he would have realized that despite extended washing with water, more than 10% of the usable pores in the lumen of the membrane remain clogged, and the membrane requires a wash with an aqueous solvent in which the PVA is far more soluble than in water. They would have disclosed such a complex cleaning requirement.

The Problem:

Currently used braided multifilament membranes are more readily susceptible to damage than they should be, resulting in leakage. The inventors herein discovered that such damage, resulting in leaks, typically occurs at vulnerable "thin spots" where yarns overlap near the surface of the braid; further, that such overlap of multifilament yarns or broken yarn is also conducive to formation of "whiskers" or "fuzz" which initiates pin-hole leaks, resulting in a low bubble point. Since in the '444 patent, thin film is deliberately restricted to the upper portion of the tubular braid, the uncoated lumen is formed and reinforced with unprotected, braided yarn, prone to whiskering. Such yarn tends to trap contaminant particles entering with the backwash and broken whiskers contaminate the permeate.

Still further, the relatively greater thickness of multifilament braid, relative to the thin film of polymer overlying the surface of the braid, results in a non-uniform thin polymer film having poor adhesion and a variable, low peel strength. In those instances where the lumen of the braid is deliberately coated with polymer film, the annular thickness of polymer film is uncontrollable (as evident in the '607, '869 and '075 patents inter alia). Though the '517 publication presented the concept of using a dissolvable polymer core such as PVA, what remained to be discovered was (i) how to overcome the degradation problem of PVA, yet make a reliably uniform core, (ii) how to make a flexible non-degraded PVA core which is strong enough to withstand the forces required to make an open weave braid snugly supported on the core, (iii) how to overcome the problem of dissolving the PVA core within a reasonably short time, and (iv) how to ensure that upon solving the prior two problems, the resulting membrane would have unclogged pores. Clogged pores would greatly diminish the permeate efficiency of the membrane. The goal was to obtain higher permeate efficiency than that obtained with multifilament reinforced membranes, and to remedy the aforementioned problems of braided membranes exemplified by the '517, and '444 membranes.

SUMMARY OF THE INVENTION

It has been discovered that using only monofilaments ("filaments"), and eliminating the use of multifilament yarn, produces an unexpectedly superior braided membrane. Multiple filaments are woven (interlaced, plaited or braided) directly upon an aqueous-dissolvable solid core or "cable" of necessarily plasticized poly vinyl alcohol ("PVA"), plasticized with a plasticizer in an amount sufficient to yield a homogeneous, solid, flexible extrudate having a density±10% of the density of PVA and sufficient strength to provide an elongated, continuous, solid support for a braid of monofilaments woven on the surface of the extrudate. The PVA is preferably plasticized with from 5-20% by weight of a plasticizer chosen from poly ethylene glycol ("PEG"), poly propylene oxide glycol ("PPG"), ethylene oxide capped poly propylene oxide glycol ("EO capped PPG"), sorbitol, glycerol, ethylene glycol, poly vinyl pyrrolidone ("PVP"), pentaerythritol, 1,4-monoanhydrohexitol, 1,4-3,6-dianhydrohexitol and copolymers of poly vinyl acetate. Without the critical amount of plasticizing, the cable would degrade when melt-extruded; would not have the flexibility to survive further processing, or, the requisite strength to withstand the forces of weaving from 6-20 monofilaments on the core's surface; and, if not essentially completely soluble, that is >99% soluble, in an aqueous cleaning bath, the membrane, when formed, could not be parted from the cable.

The solid continuous cable, of arbitrary length, has a diameter "dc" smaller than the nominal outer diameter of the membrane to be made ("dm") by twice the thickness "dt" of the wall of the membrane; that is, dc=dm−2dt, and dm is in the range from 0.75-2.6 mm, and dt is in the range from 0.2-0.6 mm. The flexibility of the cable is such that a plasticized cable with dc=2.0 mm can be wrapped around a cylinder 1 m in diameter at 25° C. without breaking.

The filaments are spirally woven on the cylindrical surface of the cable to form an open, tubular braid free of a restricting circumferential filament in the x-y plane. By "open" is meant that the braid has an air permeability much greater than 10 cc/sec/cm$^2$ at 1.378 kPa because the braid has essentially no resistance to air passing through it, therefore ensures thorough infiltration and embedding of the braid in the liquid membrane polymer. The diameter of the cable is chosen to match the diameter of the lumen of the membrane to be made, and the weave is such that liquid membrane polymer embeds more than 99% of the filaments including those in contact with the uniformly smooth and cylindrical surface of the cable. In practice, after coagulation of the membrane polymer, the diameter of the membrane's lumen is slightly, from 1-10%, greater than the diameter of the cable. Further, the monofilaments of the open weave occupy less than 50% of the cylindrical surface, preferably less than 25%, depending upon the diameter of the filaments and the spiral angle of the weave. A typical tubular braid 2.0 mm outer diameter, which is circumferentially continuous, collapses into a shapeless braid if the cable upon which the braid is woven, is removed before the membrane is formed. Such a braid has no shape, and has no meaningful cylindricity.

Typically, the braid when woven and supported on the cable, has a cylindricity of >0.8. The braid is woven using from 6-24 filaments of the same diameter, each typically having a density in the range from 0.9-1.5 g/ml and a denier in the range from 25-250 denier, approximately equivalent to a diameter of from 50-160 μm. If there is an overriding reason to do so, a mixture of coarse "reinforcing" and relatively fine "mesh" filaments may be used.

The braid, as a monolayer of monofilaments snugly overlying the cable, in turn, provides support for a tubular film of polymer film formed after the braid is infiltrated with dope and coagulated. The membrane so formed has unexpectedly greater peel strength, durability and a higher bubble point than a multifilament braid of comparable nominal diameter. The term "monolayer" refers to a single layer of filament in which layer the only filaments overlying one another are those at locations where two filaments are interlaced over one and another. Interlaced filaments are movable relative to one and another until embedded in coagulated polymer. Except in some instances in which the open weave is relatively closely woven and the thickness of the membrane is only slightly greater, that is, <5% greater than twice the diameter of the reinforcing monofilament used, the volume of the monolayer of filament occupies a minor portion (that is <50%) of the annular volume of the membrane.

There is no acknowledgment in any reference that producing an open weave braid of the claimed diameter, with monofilament having the aforestated diameter, while the braid is supported on a cylindrical cable chosen to match the desired diameter of the lumen of the membrane to be formed, requires especially novel, modified spinning machinery not known by the inventors to be available in the prior art, anywhere.

The hollow fiber asymmetric microporous membrane ("membrane") produced as described herein has a relatively thick wall of polymer film, preferably >0.2 mm but <0.5 mm thick, within which the monolayer is embedded near the lumen. A membrane so produced avoids problems associated with braids woven with any multifilament yarn irrespective of the polymer used for the membrane.

A tubular braid having a unique, open, weave (referred to as "open-weave braid") is woven with multiple monofilaments each in an axially longitudinal helical configuration, in a monolayer with a rhomboid-shaped or diamond pattern (as in a playing card), as shown in FIG. 1. Preferably from 12 filaments are used, depending upon the thickness (denier) of the filament and the diameter of the tubular membrane to be woven. Preferably the braid for the novel membrane is woven from filaments of the same diameter. A preferred braid is woven with filaments of a single denier in the range from 80-120 denier and the membranes formed have a nominal outer diameter in the range from 0.85-2.5 mm using a cable having a diameter in the range from 0.5-2.0 mm, the wall thickness being in the range from 0.2-0.6 mm.

The monolayer can only be embedded so as to define, in combination with coagulated polymer surrounding the monolayer, the lumen of the membrane. The position of the embedded monolayer relative to the polymer above it, can only be manipulated by changing the nominal outer diameter of the membrane.

More specifically, the monolayer of monofilament in the membrane provides rhomboid-shaped zones corresponding to the open-weave braid. The width of each zone is defined by the arcuate (because it is circumferential) rhomboid area within the recurring area confined by intersecting filaments. Since the filaments typically occupy less than 25% of the cylindrical area of the cable, the resulting relatively large filament-free radial zones of polymer formed, provide better (greater) filtration into the lumen than that obtained with a braided multifilament yarn in a comparable prior art membrane. The membrane has an adhesive strength>10 Kgf/cm$^2$, a bubble point>2 bar, and a percent rejection of 0.03 μm polystyrene bead>90%, and more preferably the membrane has an adhesive strength>15 Kgf/cm$^2$, a bubble point>4 bar, and a percent rejection of 0.03 μm polystyrene bead>95%.

Further, high permeate rates are maintained for longer than in a comparable multifilament membrane.

A process is described for embedding a monofilament, tubular open-weave braid of monofilaments comprising, weaving an open tubular braid having a recurring rhomboid pattern of synthetic resinous monofilaments in the denier range from 25-250, directly over the surface of, and snugly contacting a core cable ("cable" for brevity) of poly vinyl alcohol plasticized with from 5-20 weight percent of plasticizer, the cable having a diameter chosen to provide a lumen of desired diameter in the range from 0.5-2.0 mm; coating the tubular braid with a membrane-forming dope in a coating nozzle until the dope infiltrates into an area below the surface of filaments overlying the cable to form the lumen; pulling the cable and braid together through the coating nozzle; coagulating the dope to form a semipermeable thin polymer film in a membrane embedding the braid as a monolayer which, together with polymer surrounding it, defines the lumen of the membrane; washing in hot water until at least 99% of the plasticized PVA is removed, further washing with an oxidizing agent chosen from sodium hypochlorite (NaOCl), hydrogen peroxide and potassium hypochlorite (KOCl) to make a membrane which has a total organic carbon ("TOC") of <0.5 ppm without damaging the lumen of the membrane formed.

From the foregoing it will be evident that having first made the discovery that "whiskering" and "fuzz" (associated with multifilaments) were the root cause of membrane leakage, what still remained to be discovered was (i) how to make the membrane having the diameter stated, (ii) how to position a monolayer of monofilament so as to define the lumen of a uniformly thin membrane, (iii) how to control the thickness of membrane polymer both above and beneath the monolayer of braid, (iv) how to melt-extrude a PVA cable having the stated diameter with physical properties suitable for the task at hand, and (v) how to rid the membrane of essentially all plasticized PVA and contaminants so that the TOC of the membrane is preferably below 3 ppm.

The complex nature of the solution to the problem cannot reasonably be disregarded in any attempt to use the teachings of the foregoing references as an enabling disclosure.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which:

FIG. 6 illustrates the transfer of a bundle of fibers cut from the spool taken from the winder bath, which bundle is given a finishing treatment with dilute aqueous sodium hypochlorite (NaOCl).

DETAILED DESCRIPTION OF PREFERRED EMBODIMENTS

Figure 1:
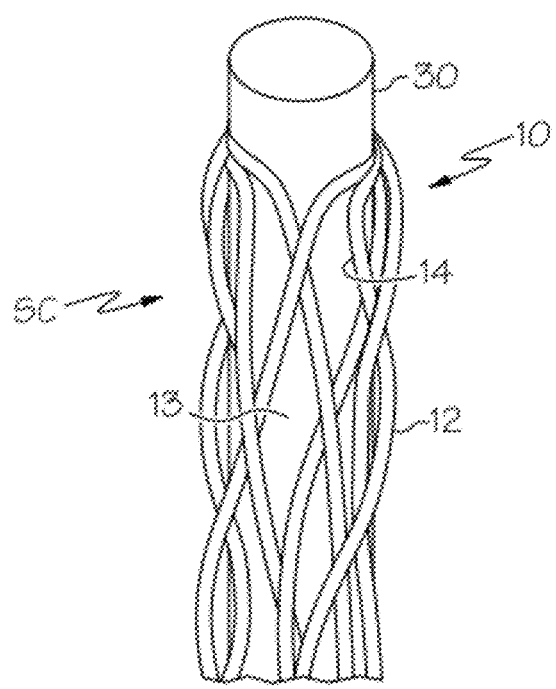
FIG. 1 is a front vertical perspective view, of a braid supported on a cylindrical support referred to as a cable, prior to being infiltrated with a dope.

Supporting the Braid as it is Woven on the Cable:

Referring to FIG. 1, there is shown a sheathed cable "SC" comprising a cable 30 over which is spirally woven a braid 10 comprising monofilaments (or "filaments") 12. The filaments 12 are made from a synthetic resinous material ("filament polymer") which is insoluble in permeate to be filtered through the membrane to be formed. The filament polymer is preferably selected from the group consisting of poly vinylidene fluoride ("PVDF"), polycarbonate, polystyrene, polyester, polyolefin, polyamide, poly meta acrylate, poly vinyl chloride and glass fiber. Filaments 12, typically all of the same denier, are wound at the same spiral winding angle greater than 20°, preferably in the range from 20°-60° relative to the longitudinal axis of the mandrel by a custom-built braiding machine using twelve (12) cones modified to hold and discharge a filament less than 250 μm in diameter; some filaments, typically alternate filaments, are wound at an axially, oppositely directed angle from each other to provide interlaced filaments in what is commonly referred to as a diamond weave. A large winding angle indicates the filament is wound closer to the x-y plane (a transverse orientation); a small winding angle indicates the filament is more axially aligned as it is wound.

Figure 2:
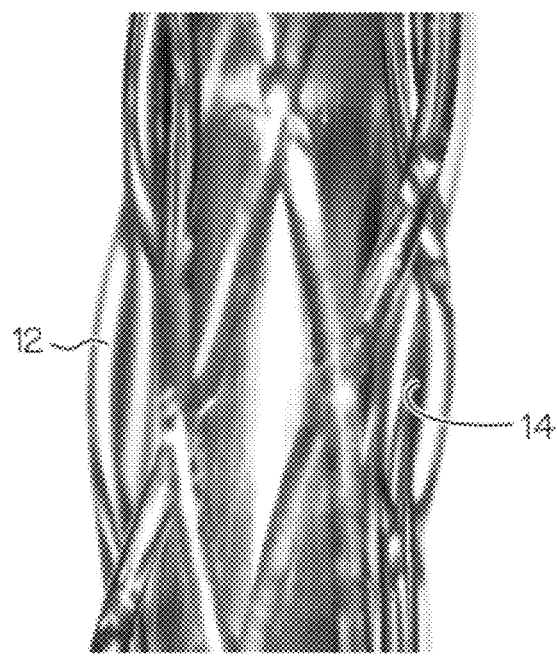
FIG. 2 is a photomicrograph of a sheathed cable at a 50× magnification showing the cable 30 over which twelve monofilaments 12, each 100 denier, are spirally woven at an angle of about 35° to the longitudinal z-axis of the cable.

As stated above, FIG. 2 is a photomicrograph of a portion of the sheathed cable showing how twelve (12) filaments 12 snugly embrace the cable 30 leaving small clearances 13 between the underside of the filaments and the cable, into which spaces polymer 20 infiltrates. The location of the braid relative to the cable in the polymer defining the lumen formed when the cable is dissolved, is thus fixed. It's location relative to the wall thickness of the membrane, for a stated diameter of the lumen, can only be manipulated by increasing or decreasing the nominal outer diameter of the membrane.

Figure 3:
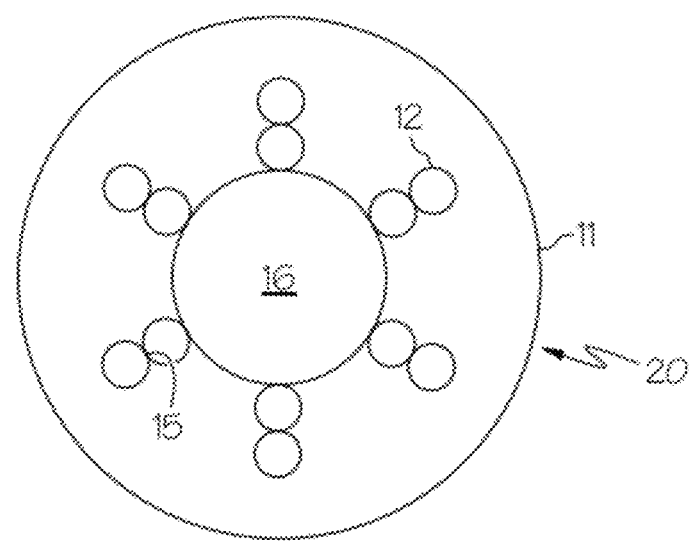
FIG. 3 is a schematic cross-sectional view of the membrane in the x-y plane at right angle to the axial z-axis showing filaments of a monolayer of braid woven with 12 filaments overlying one another.

FIG. 3 illustrates a cross-section of the coagulated film 11 showing the overlap at intersections of the embedded filaments 12 of the braid forming the membrane 20 on the cable 30. When the braid of filaments 12 is woven over the cable 30, there is a small clearance 14 in the range from 0.05-0.2 mm between the surfaces of the overlying filaments 12 into which clearance coagulated film 11 infiltrates. Though an open-weave filament is expected to be weaker than a prior art weave of multifilament, the resulting open-weave membrane retains its tubular configuration without collapsing under suction pressure exerted during filtration, and has excellent peel strength of at least 15 kgf/cm². The braid, with the cable removed, has an air permeability>(greater than) 100 cc/sec/cm² at a ΔP of 1.378 kPa. The monofilament construction of the braid ensures stability and a minimal moisture regain, much less than that of a comparable multifilament braid; and the unique open-weave of the braid 10 makes it unnecessary to preshrink it to ensure its stability.

Figure 4:
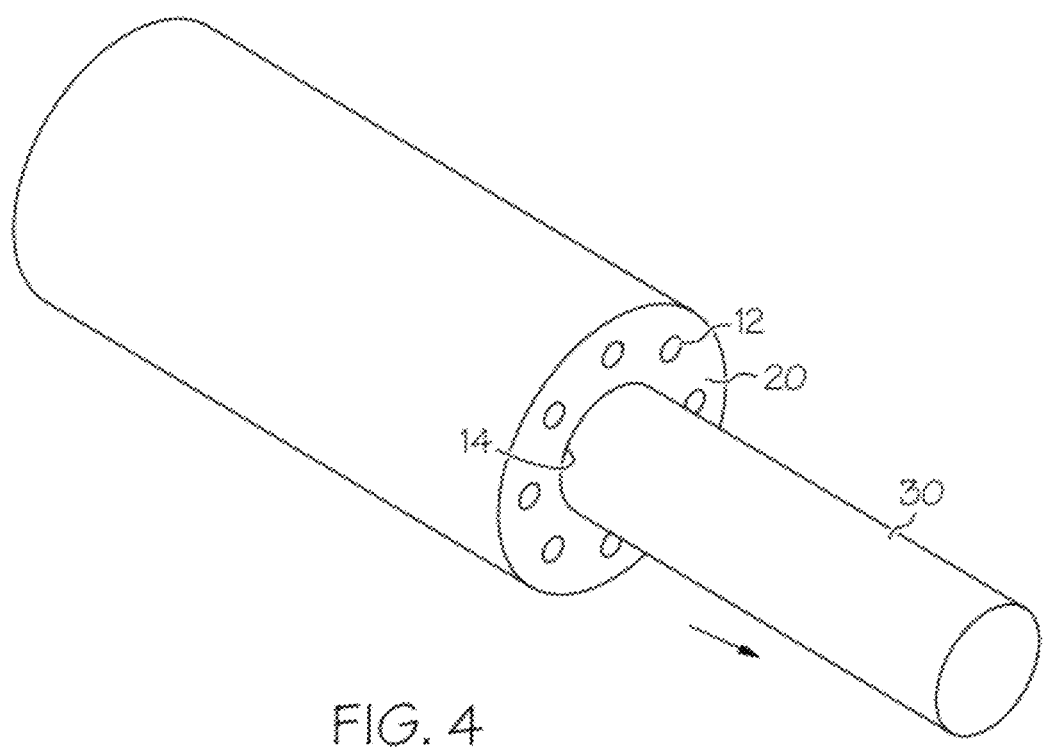
FIG. 4 is a perspective isometric staggered cross-sectional view schematically illustrating the filaments snugly covering the cable which is to be dissolved, leaving a small clearance between the cable and filaments filled with coagulated polymer, so as to form the lumen of the membrane after coagulation.

FIG. 4 illustrates the coagulated membrane 20 on the cable 30 after the film 11 infiltrates onto the surface of cable 30, filling the spaces (clearance shown on an exaggerated scale) 14 between the inner surfaces of the filaments 12 and the cable 30.

Figure 5:
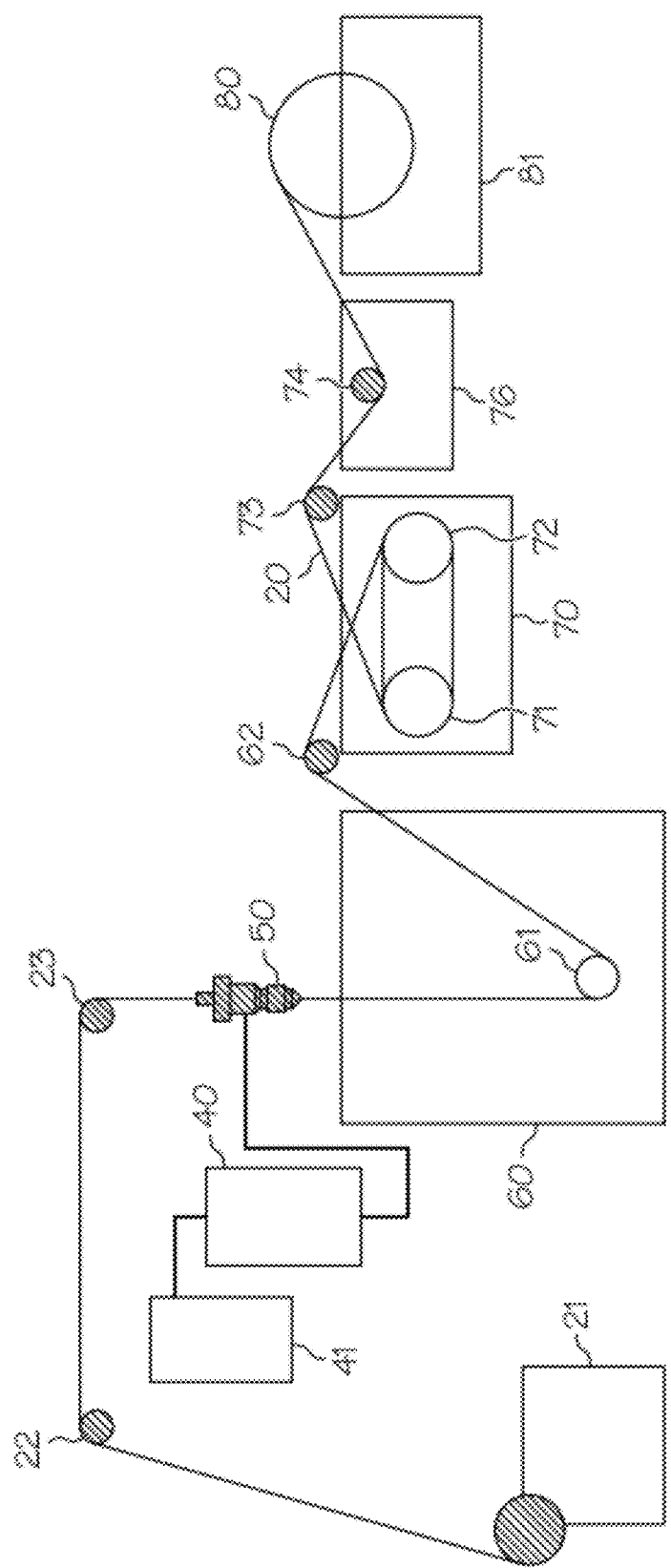
FIG. 5 illustrates the process steps for forming the membrane starting with a flexible, plasticized PVA cable sheathed in an open weave braid to produce a membrane which is wound on a spool in a winder bath.

Hollow Fiber Membrane and Process for Making it:

Referring to FIG. 5, there is schematically shown a flowsheet for the process of making a braided PVDF membrane wherein a sheathed cable SC (tubular open-weave braid 10 of twelve filaments 12, each 100 denier, covering cable 30) is fed from braid un-winder 21 over guide rolls 22 and 23 to a coating nozzle 50.

The dope is prepared by mixing from 10~30% by weight of the PVDF with from 70~90% by weight of N-methylpyrrolidone (NMP) in a dope tank 40 in which the dope is blanketed with an inert gas, preferably nitrogen, from cylinder 41. The dope may be prepared by any conventional method and may include suitable additives, if needed. The dope is prepared by mixing 20 wt % of PVDF (product name: Solef 1015) and 80% of N-methylpyrrolidone (NMP) at 60° C. at a temperature in the range from 30° C.~100° C., preferably 40° C.~70° C. so that the viscosity of the dope is in the range from 30,000 cps~60,000 cps at 30° C.

The covered cable SC is fed from unwinder 21 and over guide rolls 22 and 23 to a coating nozzle 50. Cable 30 is an extrudate of PVA plasticized with 10% glycerine. The cable has a diameter of 0.75 mm; the filaments are woven at a weave angle of 35° to sheathe the cable 30 with the open-weave tubular braid.

The dope is metered through coating nozzle 50 to produce a 400 μm thick film with the braid embedded in the bottom of the film. The dope is then coagulated at a temperature of 30~50° C. in an aqueous coagulation bath 60 and fed over guide rolls 61 and 62 to a cleaning bath 70. The wash water in cleaning bath 70 is maintained at a temperature of 40~80° C. for from 0.5~1.5 min to dissolve and wash out the residual NMP from the membrane.

The membrane 20 on cable 30 leaves over guide roll 73 and is cleaned in a second cleaning bath 76 maintained at a temperature of 60~80° C. after which the cleaned membrane leaves under guide roll 74, and is captured on a winder 80 in a winder bath 81 of diluted 50% aqueous glycerine. The diluted glycerine prevents an upper layer of wrapped membrane from sticking to a contiguous lower layer. The purpose of the winder is to store the washed membrane and the cable still supporting it, until the membrane can be cut into short sections, approximately the length desired for building a desired module, and freed from the plasticized PVA cable.

Accordingly, as illustrated in FIG. 6, a bundle 25 of about 2500 cut sections each about 2.5 m long, is hung vertically in a cable-dissolving tank 26 into the top of which is introduced 60~80° C. hot water until the bundle is submerged. As the plasticized PVA dissolves, it flows downwards through the lumens of the membranes because the density of a saturated solution of PVA is about 1.33. The water contaminated with PVA collects in the bottom of the tank as dissolved PVA and is removed.

When the concentration of PVA in the wash water leaving tank 26 is <0.5% the bundle 25 is removed from the tank 26. Because too many pores of the membranes are still clogged, the bundle 25 is mounted horizontally in tank 27 into which an aqueous solution of from 0.1-0.5% NaOCl solution at from 20° C.-80° C., preferably from 40° C.-60° C., is introduced to remove the remaining PVA and other contaminants which would restrict flow of permeate into the lumen. The solution is continuously recycled by pump 28 through piping 29 overnight, then drained through drain pipe 31. The bundle of membranes, each with a lumen having a diameter of 0.8 mm, now free of PVA and other contaminants which clogged the pores of the membrane, is transferred to a module-building facility.

The monolayer of braid 10 is thus embedded in coagulated PVDF film 11 which has excellent permeability and is essentially insoluble in water. The polymer acquires a pattern of rhomboid areas 13 (see FIG. 1) generated by the embedded braid, each area bounded by monofilaments 12. These areas 13 provide direct unobstructed radial passage of permeate into the lumen 16. "Radial passage" refers to the path of permeation from the surface of the membrane 20 to the lumen 16. To control the pattern, and also to provide greater strength, the filaments 12 may be sonically or thermally welded at intersections 15. The intersections 15 are the only locations where the filaments overlap each other. The area of each of the zones depends upon the openness of the weave, the diameter of the filament used and the spiral angle of the weave.

The diameter of plasticized PVA cable used is chosen according to the desired diameter of the lumen (inner diameter of the membrane). Typically, the cable, whether one or more, has an average diameter in the range from 0.1~1.8 mm, preferably 0.5~1.5 mm, to provide a braid reinforced membrane having an average wall thickness in the range from 0.2-0.5 mm. If more than one cable is used to minimize the amount of plasticized PVA used and to accelerate dissolution of the core, as may be done to make a membrane with a relatively large diameter, >2.2 mm, and a lumen having a relatively large diameter, >1.2 mm, the cables are tightly bundles so as to be in fluid-tight contact with one and another. The resulting lumen is non-circular and the wall thickness of the membrane formed is non-uniform.

Preferred braided membranes have a bubble point of at least 2 bar. The novel membrane has an adhesion strength of more than 15 kgf/cm$^2$ typically from 12 to 20 kgf/cm$^2$.

The open-weave monolayer braid 10, embedded in the polymer film 20, unexpectedly provides excellent permeability and resistance to damage. The embedded monolayer eliminates a "whiskering" problem common to braids woven with one or more multifilament yarns.

The recurring open areas in the open-weave braid provide circumferential, interconnected rhomboid or diamond-shaped loops 13 lying in the vertical (as shown in FIG. 1) axial (z-axis) direction, and, no filament is deployed circumferentially in a generally planar circle in the x-y plane. Since there is no constriction in the radial direction, not only the braid but also the membrane may be biaxially distended under sufficient internal fluid pressure prior to being damaged. By "biaxially distended" is meant that the open-weave braid allows not only substantial longitudinal extension of the membrane, such as might occur during backwashing, but also allows substantial radial distension of the membrane which typically does occur during backwashing. As would be expected, the longitudinal expansion of the embedded braid is much less than that of the braid itself, but much greater than that of a prior art multifilament braid coated with the same polymer.

The rhomboid pattern 13 is retained when the intersections of filaments 12 are welded. The pattern may be more close-knit (not shown) so that it provides a membrane with smaller radially open passages to the lumen, each of smaller area relative to an area defined by the relatively loosely knit braid (shown).

Prior art braids, woven with multifilament yarn, have at least some of the yarn forming an essentially continuous circle in the x-y plane, thus resulting in constricting any radial distension of the braid. Prior art tubular multifilament braids are therefore inelastic in the radial direction. This constricting property is retained even when the braid is embedded in an elastic polymer film. Pressure exerted from within a prior art multifilament tubular braided membrane, cannot and does not increase the diameter of the braid, thus making it susceptible to damage. In contrast, in addition to the longitudinal extension one would expect of the elastic properties of a polymer-embedded, open-weave monofilament reinforced tubular membrane, such properties allow the membrane to expand or distend radially, when sufficient pressure provides a radial distending force. Consequently, a relatively higher pressure than normally used, sufficient to distend the membrane but insufficient to damage it, may be used to backwash the membrane.

EXAMPLE 1

Duplication of feeding a monofilament braid as described in the Yoon et al publication No. US 2009/0206026:

A monofilament braid of 100 denier (0.1 mm) nylon monofilament was spirally woven on a 1.0 mm cable of metal wire, alternate filaments being woven at opposed spiral angles of 30°. The sheathed cable was placed on a 2.54 cm diameter rubber roller rotating at 30 rpm. The braid was crumpled on the cable and could not be advanced. The speed of the roller was reduced to 15 and then 5 rpm. In no case was the braid advanced without damage. The roller speed was then increased to 40 rpm. The braid was crumpled.

EXAMPLE 2

The following three grades of PVA available from Kuraray were each melt extruded in a single screw Hankook Model M-65 extruder fitted with a 65 mm diameter screw having a length/diameter ratio of 22. The barrel temperature is 195° C. and the die temperature 160° C. The die is provided with 18 through-apertures (holes) and its diameter is 1.6 mm. The air quenching length for the PVA cable is 2 m in 25° C. air for 2 seconds. The drawing ratio is 1.5:1.

|  | Extrusion Temp 195° C. |
| --- | --- |
| Fully hydrolyzed (F-05 and F-17) | degrades |
| Intermediate hydrolyzed (M-17) | degrades |
| Partially hydrolyzed (P-24, P-20, P-17 and P-05) | degrades |

EXAMPLE 3

A braid is formed by weaving 12 filaments, each of 100 denier nylon, at a spiral angle of 35° over a plasticized PVA cable having a diameter of 0.75 mm using a custom-built braiding machine. The sheathed cable is pulled through a coating nozzle into which a dope, prepared as described above to have a viscosity of 43,000 cps at 30° C., is flowed at an output rate of 11 g/min. The dope infiltrates the braid, coats the cable and embeds the braid. The membrane is coagulated in a water bath at 45° C. and washed as shown in FIG. 5. The wall thickness of the membrane is 400 μm the braided monofilaments forming a monolayer around the lumen which has essentially a little larger diameter than that of the dissolved cable, namely 0.8 mm, because PVA cable is swollen in the coagulation bath and cleaning bath before the membrane finish its coagulation. The cross-section of the braid is schematically illustrated in FIG. 3.

The physical properties of the membrane made in Example 3 above, are given in Table 1 below.

EXAMPLE 4

In a manner analogous to that described in Example 3 above, a dope, prepared as described above to have a viscosity of 43,000 cps at 30° C., is flowed at an output rate of 16 g/min a braid is woven at the same spiral angle, over a cable having a diameter of 1.1 mm using 12 nylon monofilaments, each of 100 denier (0.1 mm) to yield a membrane with a 1.25 mm lumen, and a nominal outer diameter of 2.05 mm.

COMPARATIVE EXAMPLE

In a manner analogous to that described in Example 3 above, a braid is woven at the same spiral angle, without using a cable, with twenty four PET multifilament yarns each 300 denier/96 filament (a single filament is superfine, about 3 denier) and having an inner diameter of 0.85 mm; the braid was embedded in the same polymer solution to provide a wall thickness of 650 μm (0.65 mm, but the membrane film thickness is about 100 μm).

Evaluation of Physical Properties:
1. Water Permeability
(i) A membrane having a length of 200 mm is folded once to insert in an acrylic tube having a diameter of 10 mm and a length of 100 mm. One end of the membrane is sealed with epoxy (or urethane). The other end of membrane is open.
(ii) The open end as described is mounted in a water permeability testing apparatus.
(iii) A liquid in a pressure vessel is discharged when a pressure is applied to the liquid, and the discharged liquid flows into the tube. A membrane is hung at the end of the tube. The water permeability is obtained by measuring the amount of permeated liquid from the membrane sample.
(iv) filling the tube with water and hanging the sealed part of the membrane on the beaker to collect the permeate.
(v) applying a pressure of 1 bar to the vessel containing water therein and measuring the amount of water discharged from the acryl tube.
(vi) measuring the weight of permeate in the beaker and calculating water permeability by measuring the amount of discharged water.
2. Adhesion Strength:
(i) preparing a hollow fiber membrane having a length of 50 mm
(ii) preparing a urethane tube having a length of 50 mm and a diameter of 10 mm
(iii) put 10 mm of the membrane in the urethane tube and potting with epoxy (or urethane)
(iv) A gage length for Instron (UTM) was 70 mm. 10 mm of the end of the membrane was wrapped with a paper so as not to break. Any material providing suitable gripping without deteriorating the membrane can be used instead of the paper. When the membrane is secured by Instron, the membrane should be straight from the upper part to the bottom part. Further, upper/bottom grip should not be swayed during the operation of Instron.
(v) The crosshead speed was 50 mm/min, The maximum tensile stress is divided by its unit area, so the maximum tensile stress is registered as the adhesion strength.

The average elongation at break is registered as the elongation.
3. Bubble Point
(i) Use the same sample prepared for the water permeability test, except that the tube including a membrane is dipped in the water bath.
(ii) When the membrane is wetted, the pressure vessel was charged with nitrogen instead of the water.
(iii) adjusting a pressure regulator of nitrogen from 0 bar to 8 bar at an interval of 0.5 bar with holding 60 seconds to hold its pressure.
(iv) measuring the pressure when the air bubble is formed on the surface of the membrane or burst at once.
(v) The pressure at which the air bubble or burst of the membrane appears is registered as the bubble point.
4. Percent (%) Rejection of Particles
UV [using a Perkin Elmer Lambda 25 UV/vis spectrometer]
(i) preparing two strands of the hollow fiber membrane having a length of 100 mm
(ii) inserting the membrane in an acrylic tube having a internal diameter 10 mm and a length of 100 mm; sealing one end of the membrane with paraffin (or urethane). The other end of the membrane is potted in the acrylic tube to prepare a sample.
(iii) mounting the sample in a water permeability testing apparatus (iv) preparing a solution for measuring rejection ratio, as follows:

A styrene bead dispersion was prepared by mixing thrice distilled water, styrene beads having a size of 0.03 μm and surfactant to prevent styrene beads from sticking together and agitating the mixture for 1 hr.

(v) pouring the styrene bead dispersion in a pressure vessel and passing the styrene bead solution through the membrane under a pressure of 0.5 bar and collecting the solution passed through the membrane after 1 minute.

(vi) sampling a water base (thrice distilled water or RO water) and a feed dispersion (the styrene bead dispersion).

(vii) setting a base line of the base solution (thrice distilled water or RO water) using a UV-Visible spectrometer and measuring the absorbance of the feeding solution, then measuring the absorbance of a sample passed through the membrane.

(viii) The % rejection can be obtained by using a UV-Visible spectrometer and be calculated by the following formula:

Rejection(%)=(1−$Cf/Cp$)*100

$C_{feed}$: absorbance of the feeding solution:
$C_{permeate}$: absorbance of a sample passed through the membrane According to the formula, 90% or more of the rejection ratio is useful and pore size of the membrane can be estimated indirectly.

TABLE 1

|  | Outer Diam. (mm) | Inner Diam. (mm) | Water Permeability (LMH/Bar) | Adhesion Strength (Kgf/cm$^2$) | Elongation at break (%) | Bubble Point (bar) | Pore Size (μm, SEM) | Rejection Ratio (%) |
| --- | --- | --- | --- | --- | --- | --- | --- | --- |
| Example 3 | 1.6 | 0.8 | 800 | 17 | 51 | >5 | 0.03 | 98 |
| Example 4 | 2.05 | 1.25 | 800 | 18 | 52 | >5 | 0.03 | 97 |
| Comparative Example | 2.1 | 0.85 | 600 | 12 | 31 | 1.5 | 0.04 | 95 |

It is evident from the Table 1 above, that the pore sizes for each of the membranes are essentially the same, as one would expect. However, the water permeability of the membrane with multifilament yarn in the braid, is only 75% of the membrane with the monofilament braid, its bubble point is lower than 33%, and its elongation at break is 66% lower than that of the membrane with the monofilament monolayer braid.

Weight Advantage of Monofilament Braid Membrane

Equal lengths (1 m) of a membrane made as described in Example 3 and 4, and a membrane made with a multifilament braid described in the Comparative Example above are dried so as to contain less than 1% by weight of water. Each membrane was then soaked in 30% glycerine solution for 24 hours and dried at 30° C. convection oven for 4 hours and weighed. The membranes were thereafter soaked in water for 24 hours, then weighed. The results are given in Table 2 below.

TABLE 2

|  | Membrane weight after drying (g/m$^2$) | Membrane weight after 30% Glycerine treatment (g/m$^2$) | Membrane weight after water intake (g/m$^2$) |
| --- | --- | --- | --- |
| Example 3 | 108 | 181 | 360 |
| Example 4 | 115 | 186 | 356 |
| Comparative Example | 255 | 385 | 516 |

It is evident from the results above, that the multifilament braid retains more than double the amount of glycerine, and about 68% more water than the monofilament membrane. Such increased weight is magnified when several thousand membranes are assembled in a module, making it more difficult to insert and remove modules in a purification system.

Particularly with respect to the efficacy of removal of the plasticized PVA in the membranes before they are assembled into modules and placed in service, all three membranes test routinely for <0.5 ppm TOC being typically <0.3 ppm TOC using the prescribed KWWA (Korea Water and Wastewater Works Association) F 106 test. This confirms that essentially all the plasticized PVA has been removed.

Having thus described the monofilament membrane, and the process for making it, in detail, and illustrated both with specific examples of the best mode of each, it will be evident that we have provided an effective solution to an unrecognized problem. It is therefore to be understood that no undue restrictions are to be imposed, and our invention not restricted to a slavish adherence to the details set forth herein.

We claim:

1. An outside-in hollow fiber asymmetric membrane comprising, a tubular flexible braid of monofilament embedded as a monolayer in a tubular film of membrane polymer infiltrating the braid so as to form and reinforce the membrane's lumen, the braid, free of multifilament yarn, comprising, from 6 to 24 separate monofilaments in the range from 25-250 denier (g/9000 meters), woven in a spiral open weave having an air permeability greater than 10 cc/sec/cm$^2$ at 1.378 kPa, to provide contiguous rhomboid areas of the membrane polymer bounded by monofilaments, the rhomboid areas having a pair of opposed acute included angles, and the spiral weave being woven with filaments at axially oppositely directed spiral angles in the range from 20°-60° from the longitudinal axis, so as to be free of a restricting circumferential filament allowing the braid and membrane to be biaxially distensible under pressure from within, prior to being damaged;
such that the asymmetric membrane is adapted for use as a microfiltration or ultrafiltration liquid separation membrane.

2. The asymmetric membrane of claim 1 wherein monofilament is selected from the group consisting of polyvinylidene fluoride, polycarbonate, polystyrene, polyester, polyolefin, polyamide, poly meta acrylate, poly vinyl chloride and glass fiber.

3. The asymmetric membrane of claim 1 wherein monofilaments overlying one another at intersections are movable relative to each other before the film is formed.

4. The asymmetric membrane of claim 1 wherein intersections of the monofilaments, wherein one overlies another, are the only locations where the monolayer has two superimposed monofilaments.

5. The asymmetric membrane of claim 1 wherein the volume of the monofilament in the monolayer of monofilament braid occupies a minor portion of the annular volume of the membrane.

6. The asymmetric membrane of claim 5 having an adhesive strength greater than 15 Kgf/cm$^2$, a bubble point greater than 4 bar and a greater than 95% rejection of 0.03 μm polystyrene beads in an aqueous dispersion.

* * * * *